United States Patent [19]

Fitzpatrick et al.

[11] Patent Number: 5,396,564

[45] Date of Patent: Mar. 7, 1995

[54] METHOD OF AND APPARATUS FOR RECOGNIZING PREDOMINATE AND NON-PREDOMINATE COLOR CODE CHARACTERS FOR OPTICAL CHARACTER RECOGNITION

[75] Inventors: Greg Fitzpatrick, Irving; William J. Johnson, Flower Mound; Robert S. Keller, Grapevine; Marvin L. Williams, Lewisville, all of Tex.

[73] Assignee: International Business Machines Corporation, Armonk, N.Y.

[21] Appl. No.: 812,179

[22] Filed: Dec. 20, 1991

[51] Int. Cl.⁶ .............................................. G06K 4/18
[52] U.S. Cl. .................................... 382/11; 382/17; 395/110; 395/150; 101/211
[58] Field of Search ................... 382/17, 11; 101/211; 395/109, 110, 117, 131, 150; 283/114, 901; 235/406; 358/79; 380/54

[56] References Cited

U.S. PATENT DOCUMENTS

| | | | |
|---|---|---|---|
| 3,196,393 | 7/1965 | Siegmund | 382/17 |
| 3,938,088 | 2/1976 | Clark | 382/17 |
| 3,990,043 | 11/1976 | Clark | 382/17 |
| 4,009,466 | 2/1977 | Clark | 235/469 |
| 4,634,148 | 1/1987 | Greene | 283/901 |
| 4,829,568 | 5/1989 | Clark et al. | 380/23 |
| 4,831,657 | 5/1989 | Casey et al. | 382/39 |

Primary Examiner—Joseph Mancuso
Attorney, Agent, or Firm—P. W. Johnson; Geoffrey A. Mantooth

[57] ABSTRACT

Method of, and apparatus for, processing a color coded character to recognize the character being examined by an OCR device. Said color coded character comprises a predominate color associated with said character distinguishable by humans, and a non-predominate color associated with said character and non-distracting to humans, but distinguishable by a color scanner. The present invention allows the non-predominate color of a character to be used as the sole criteria for recognizing the character.

6 Claims, 3 Drawing Sheets

METHOD OF AND APPARATUS FOR RECOGNIZING PREDOMINATE AND NON-PREDOMINATE COLOR CODE CHARACTERS FOR OPTICAL CHARACTER RECOGNITION

CROSS REFERENCES TO RELATED APPLICATIONS

This application is related in subject matter to the following applications filed concurrently herewith and assigned to a common assignee:

Application Ser. No. filed 07/812,178 filed by G. P. Fitzpatrick entitled "Method of and Apparatus for Producing Predominate and Non-predominate Color Coded Characters for Optical Character Recognition".

Application Ser. No. 07/812,249 filed by G. P. Fitzpatrick entitled "Method of and Apparatus for Optical Character Recognition Based on Geometric and Color Attribute Hypothesis Testing".

The foregoing copending applications are incorporated herein by reference.

TECHNICAL FIELD OF THE INVENTION

This invention relates in general to optical character recognition, and in particular to a method of, and apparatus for, recognizing predominate and non-predominate color coded characters for optical character recognition.

BACKGROUND OF THE INVENTION

Prior art optical character recognition (OCR) techniques fall into two major categories. The first technique is geometric OCR. The second technique is color coded OCR.

Geometric OCR attempts to recognize a character based on the character's shape or the geometric representation of a set of pixels or dots. A character as used herein is meant to include a printed or written symbol which can be recognized by an OCR device or a human reader. The character can be an alphabetical symbol or an icon. Furthermore, the term pixel and dot will be used interchangeably to describe a distinguishable point recognizable by an OCR device. In such a geometric OCR approach, color is used only to define the shape of a character. Even if characters are represented by multiple colors, the multiple colors are converted to either black or a gray scale before shape analysis. Such an approach can provide a recognition accuracy as high as 99.5%. However, higher degrees of accuracy are desired. In addition, significant data storage is required for each character shape to be recognized. This means that a geometric representation of the shape of each character of the alphabet plus the other symbols to be recognized has to be stored. This data storage is redundantly duplicated for each character font supported. This means that not just one representation of the geometric shape is stored for the character "a", but that representations of the geometric shape for Prestige, Elite, Gothic, Roman, etc. versions of the character "a"0 are stored. Furthermore, computer processing time is required to compare to all of the stored shapes. Again from a redundancy standpoint, redundant computer processing time is required to compare to multiple fonts.

The second technique of color coded OCR attempts to recognize a character based on the character's color. In such an approach, color is used not only to indicate the shape of a character, but also to indicate the identity of the character. For example, "a" is printed red, "b" is printed blue, and "c" is printed yellow. Color coding OCR eliminates the data storage and computer processing requirements of geometric OCR by eliminating shape processing. Color coding OCR also can provide higher recognition accuracy rates than those of geometric OCR as it is not subject to shape processing errors. However, prior art color coded characters cause a severe visual distraction to a human reader because such prior art color coding is distinguishable to a human reader. In addition, special OCR printing apparatus and special OCR reading apparatus are used for prior art color coded characters.

The two prior art OCR approaches present four major difficulties. The first two difficulties are the substantial storage and substantial computer processing required by geometric OCR shape processing. If these shape processing difficulties are avoided by using color coded OCR, then the third difficulty is the severe visual distraction of color coding to a human reader. A fourth difficulty is the special printing and reading devices used by prior art color coded OCR.

Thus, there is a need for an OCR approach which can substantially increase the accuracy rate of optical character recognition techniques while overcoming the deficiencies with both conventional approaches.

SUMMARY OF THE INVENTION

With the proliferation of color scanners and color printers and the wide variety of optical devices which are color sensitive, a new approach can be applied to character recognition devices and programs. The invention disclosed herein comprises a method of, and apparatus for, utilizing a predominate color and a non-predominate color of a character to recognize the character being examined by an OCR device.

In accordance with one aspect of the present invention, a method of, and apparatus for, processing a color coded character for optical character recognition is provided. Said color coded character comprises a predominate color associated with the character distinguishable by humans, and a non-predominate color associated with the character and non-distracting to humans, but distinguishable by a color scanner. The non-predominate color need only be distinguishable by a color scanner, color OCR device, or color OCR program and need not be distinguishable by human perception. Such characteristics allow the character to be perceived by a human reader as the single predominate color. The amount of interlaced non-predominate color and the combinations of such colors within a character may be used to determine the identity of the character being represented. Thus, the present invention allows the non-predominate color of a character to be used as the sole criteria for recognizing the character. The technique of using a non-predominate color as an attribute for recognizing the character may be applied to as many characters as there are non-predominate colors which are recognizable by the color scanner, color OCR device, or color OCR program. Furthermore, the technique of using combinations of non-predominate colors may be applied to as many characters as there are non-predominate color combinations. Another aspect of the present invention is to provide processing of the color coded character based on processing the non-predominate color of the character.

Another aspect of the present invention is to provide processing of the color coded character based on scanning the non-predominate color of the character.

Another aspect of the present invention is to provide processing of the color coded character based on recognizing the non-predominate color of the character.

Yet another aspect of the present invention is to provide processing of the color coded character based on processing the predominate color of the character.

The present invention has the advantage of providing higher optical character recognition accuracy rates. The present invention has the further advantage of reducing the amount of storage required for OCR. The present invention has the still further advantage of reducing the amount of computer processing required for OCR. The present invention has the still further advantage of removing the severe visual distraction to a human reader of prior art color coded OCR. The present invention has the still further advantage of having no requirement for special printing or OCR reading devices.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Figure 1:
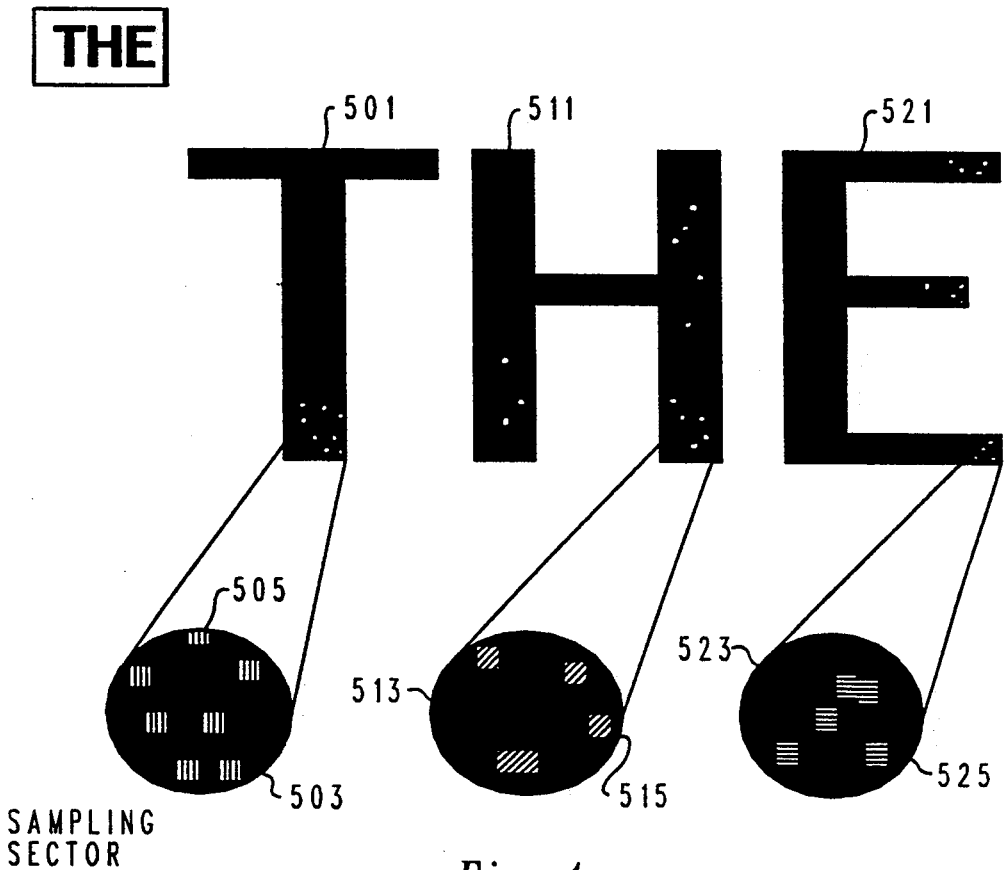
FIG. 1 illustrates a color coded technique of representing characters in accordance with the present invention.

Referring first to FIG. 1, a representation of the word "THE" composed of the three characters "T" 501, "H" 511, and "E" 521 in accordance with the present invention is shown. In this predominate and non-predominate color coded technique, each character is represented by a predominate color associated with the character and a non-predominate color associated with the character. The predominate color is readily distinguishable by humans. The non-predominate color is associated, interlaced, intermingled, or embedded with the predominate color. The non-predominate color is non-distracting to humans, but distinguishable by a color scanner. For example, the bodies of the characters "T" 501, "H" 511, and "E" 521 are all composed of a predominate color black. The black predominate color is distinguishable by a human reader, and the characters appear black to a human reader. The exploded view 503 of a portion of the body of the character "T" 501 illustrates a non-predominate color 505 which may comprise red associated with the character "T" 501. The non-predominate color 505 is non-distracting to humans, but distinguishable by a color scanner. The non-predominate color 505 is also associated, interlaced, intermingled, or embedded with the predominate color black. The exploded view 513 of a portion of the body of the character "H" 511 illustrates a non-predominate color 515 which may comprise brown associated with the character "H" 511.

The non-predominate color 515 is non-distracting to humans, but distinguishable by a color scanner. The non-predominate color 515 is also associated, interlaced, intermingled, or embedded with the predominate color black. The exploded view 523 of a portion of the body of the character "E" 521 illustrates a non-predominate color 525 which may comprise blue associated with the character "E" 521. The non-predominate color 525 is non-distracting to humans, but distinguishable by a color scanner. The non-predominate color 525 is also associated, interlaced, intermingled, or embedded with the predominate color black.

Figure 2:
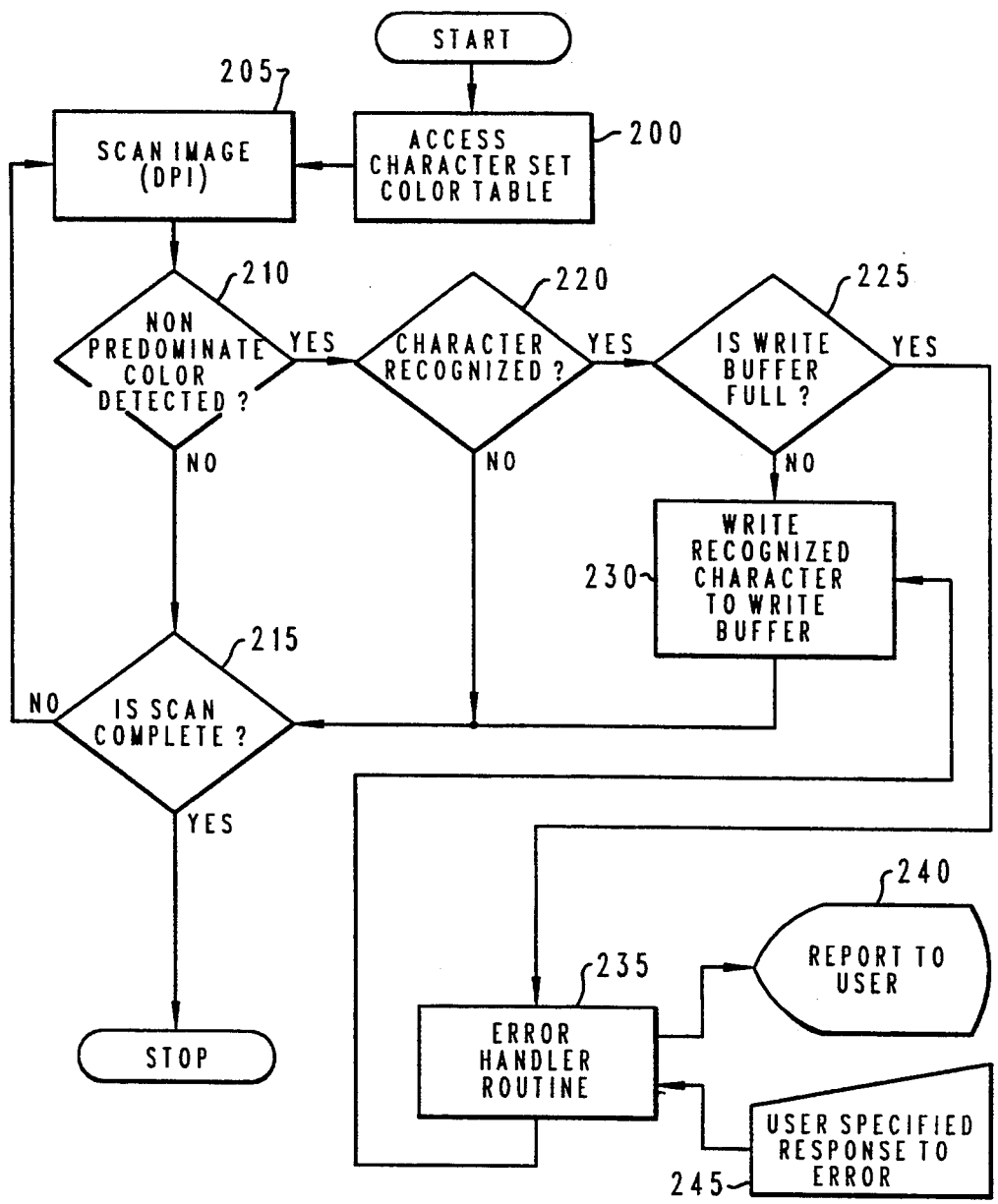
FIG. 2 is a flow chart illustrating the operations preferred in carrying out the present invention.

Referring next to FIG. 2, a flowchart illustrating operations preferred in carrying out the present invention is shown. In the flowchart, the graphical conventions of a diamond for a test or decision and a rectangle for a process or function are used. These conventions are well understood by those skilled in the art, and the flowchart is sufficient to enable one of ordinary skill to write code in any suitable computer programming language. As shown in FIG. 2, after the start of the program, process block 200 accesses a character set color table. The character set color table contains a representation of each character supported associated with the character set. Each such character representation comprises the non-predominate color attributes of the character. These attributes comprise the non-predominate color protocol for the character including: non-predominate color, non-predominate color pixel size, non-predominate color pixel density, and other attributes constituting a valid predominate and non-predominate color coded representation of the character, similar to the representations illustrated in FIG. 1.

Thereafter, process block 205 scans, by means of a color scanner, a portion of an image which may or may not contain recognizable characters. Thereafter, decision block 210 is used to determine whether or not a non-predominate color is detected within the portion of the image. If a non-predominate color is detected within the portion of the image, then decision block 220 determines whether or not the non-predominate color detected within the portion of the image meets the non-predominate color protocol for a character. If the non-predominate color detected within the portion of the image meets a non-predominate color protocol for a character, then the character corresponding to the non-predominate color protocol is recognized. Thereafter, decision block 225 determines whether or not a write buffer is full. The write buffer is the buffer in which the program writes a sequence of recognized characters. If the write buffer is not full, then process block 230 writes the recognized character to the write buffer. Thereafter, decision block 215 determines whether or not a full image scan is complete. If a full image scan is complete, then the program stops.

Returning now to decision block 215, if a full image scan is not complete, then the program returns to process block 205 for further scanning.

Returning now to decision block 225, if the write buffer is full, then process block 235, which is all exception handler routine, processes the exception. A default action of process block 235 is to transfer the contents of the write buffer to an output file, and to clear the write buffer. Process block 235 may also report an exception to a user through output device 240. In lieu of the default action, process block 235 may execute a user specified response to an exception, such as designating the output file, as specified by the user through input device 245. Thereafter, the program returns to process block 230 for writing the recognized character to the write buffer.

Returning now to decision block 220, if the non-predominate color detected within the portion of the image does not meet a non-predominate color protocol for a character, then no character is recognized. Thereafter, the program returns to decision block 215 for further scan processing.

Figure 3:
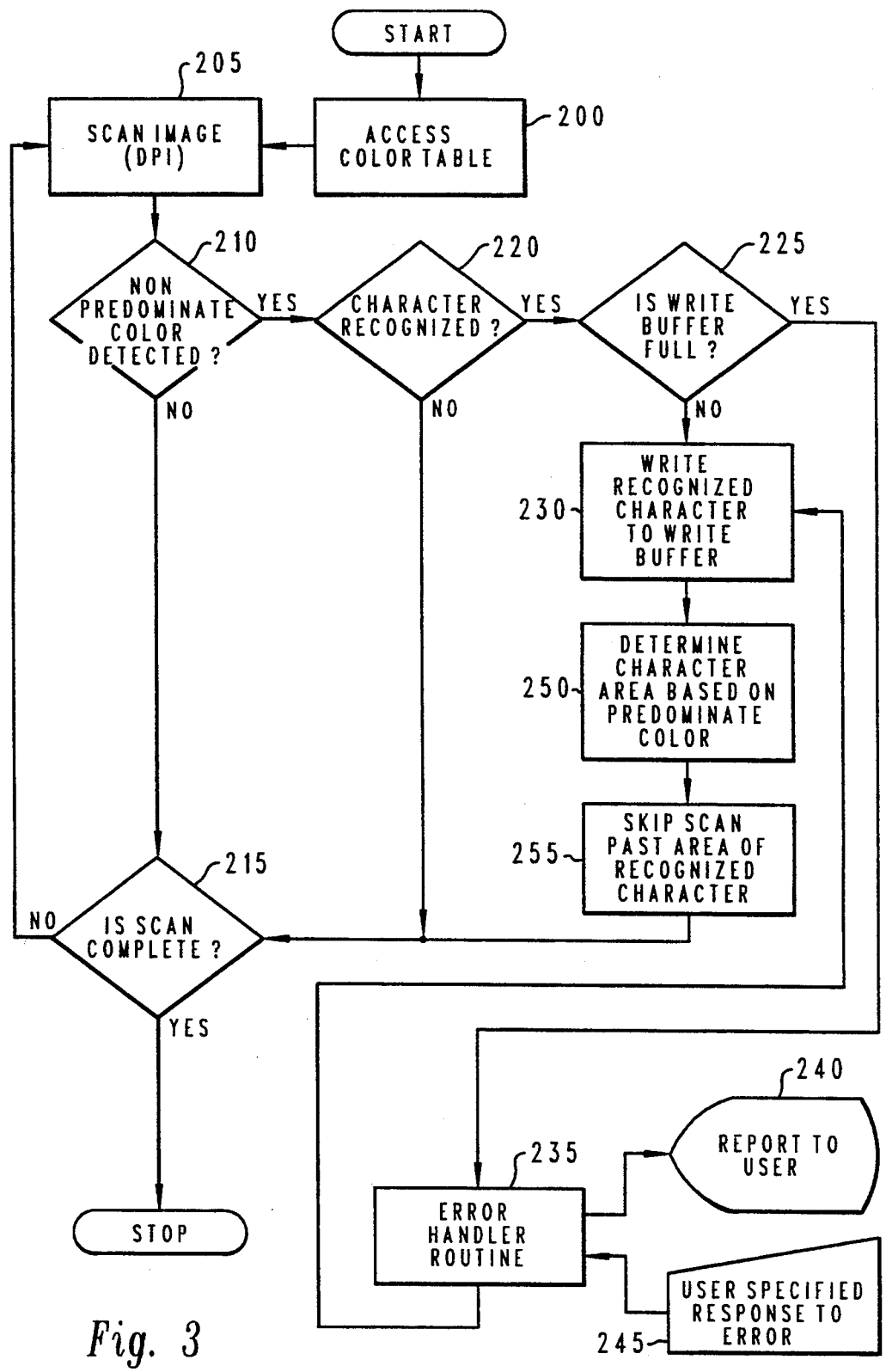
FIG. 3 is a flow chart illustrating the operations used in carrying out an alternative embodiment of the present invention.

Referring now to FIG. 3, a flowchart illustrating operations for an alternative embodiment for carrying out the present invention is shown. This alternative embodiment uses both non-predominate color and predominate color for optical character recognition; whereas, the preferred embodiment illustrated in FIG. 2 uses only non-predominate color for optical character recognition. The sequence of operations for the preferred embodiment illustrated in FIG. 2 and the sequence of operations for the alternative embodiment illustrated in FIG. 3 are identical, except for two additional process blocks, 250 and 255, illustrated in FIG. 3. The purpose of process blocks 250 and 255 is to use predominate color in the OCR process.

Referring now to process block 230 of FIG. 3, if the write buffer is not full, then process block 230 writes the recognized character to the write buffer. Thereafter, process block 250 determines the recognized character's area based on the predominate color of the recognized character. Thereafter, process block 255 skips the scan past the recognized character's area. Thereafter, the program continues to decision block 215 as illustrated in both FIG. 2 and FIG. 3.

Figure 4:
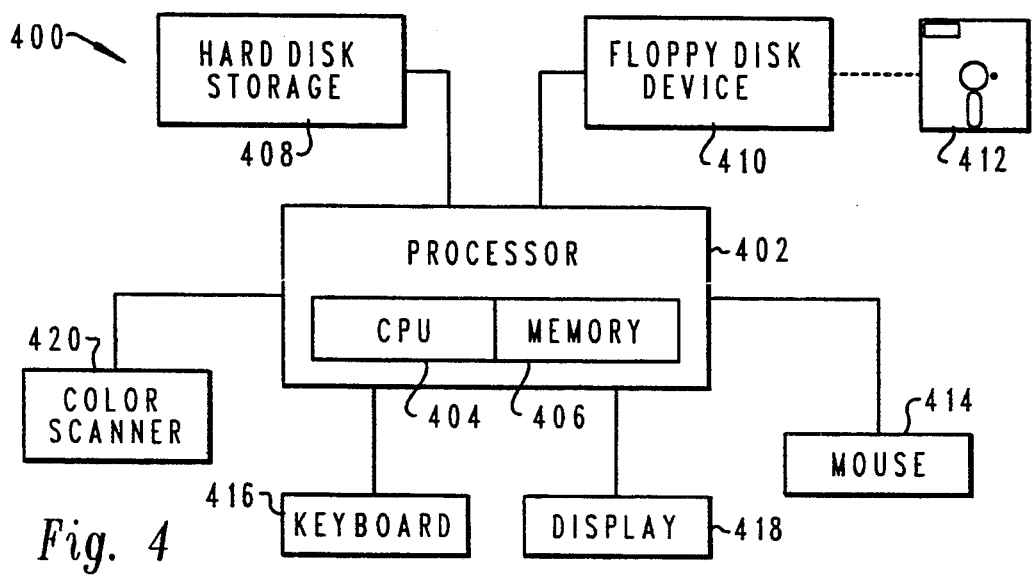
FIG. 4 is a block diagram of a computer system used in performing the method of the present invention and forming part of the apparatus of the present invention.

Referring now to FIG. 4, there is shown in block diagram form, a data processing system 400 according to the present invention. The data processing system 400 includes a processor 402, which includes a central processing unit (CPU) 404, and a memory 406. Additional memory, in the form of a hard disk file storage 408 and a floppy disk device 410, is connected to the processor 402. Floppy disk device 410 receives a diskette 412 which has computer program code recorded thereon that implements the present invention in the data processing system 400. The data processing system 400 includes user interface hardware, including a mouse 414 and a keyboard 416 for allowing user input to the processor 402 and a display 418 for presenting visual data to the user. The data processing system also includes a color scanner 420.

Although the present invention has been particularly shown and described with reference to a preferred embodiment, it will be understood of those skilled in the art that various changes in form and detail may be made without departing from the spirit and the scope of the invention.

What is claimed is:

1. A method of processing a set comprising color coded first and second characters for optical character recognition, wherein each of said first and second characters have unique geometric shapes formed by a first color with said first character geometric shape being different from said second character geometric shape, so as to define said first character relative to said second character when visually identified by a human, said first character geometric shape having one or more pixels of a second color, said second character geometric shape having one or more pixels of a third color that is different than said second color, said second and third color pixels being distinguishable by a color scanner, comprising the steps of:
   scanning said second color pixels and said third color pixels; and
   processing said scanned second color and said scanned third color.

2. The method of claim 1, wherein said step of processing said second color and said third color, further comprises the step of:
   recognizing said second color and said third color.

3. The method of claims 1 or 2, further comprising the step of:
   recognizing said first color.

4. An apparatus for processing a set comprising color coded first and second characters for optical character recognition, wherein each of said first and second characters have unique geometric shapes formed by a first color with said first character geometric shape being different from said second character geometric shape, so as to define said first character relative to said second character when visually identified by a human, said first character geometric shape having one or more pixels of a second color, said second character geometric shape having one or more pixels of a third color that is different than said second color, Said second and third color pixels being distinguishable by a color scanner, comprising:
   means for scanning said second color pixels and said third color pixels; and
   means for processing said scanned second color and said scanned third color.

5. The apparatus of claim 4, wherein said means for processing said second color and said third color, further comprises:
   means for recognizing said second color and said third color.

6. The apparatus of claims 5 or 6, further comprising:
   means for processing said first color.

* * * * *